US008978855B2

United States Patent
Wang

(10) Patent No.: US 8,978,855 B2
(45) Date of Patent: Mar. 17, 2015

(54) CLUTCH TYPE DRIVING MECHANISM FOR HYBRID POWERED VEHICLE

(71) Applicant: Lorom Industrial Co., Ltd., Taipei (TW)

(72) Inventor: Ching-Feng Wang, Taipei (TW)

(73) Assignee: Lorom Industrial Co., Ltd., Taipei (TW)

( * ) Notice: Subject to any disclaimer, the term of this patent is extended or adjusted under 35 U.S.C. 154(b) by 146 days.

(21) Appl. No.: 13/756,859

(22) Filed: Feb. 1, 2013

(65) Prior Publication Data

US 2013/0206540 A1  Aug. 15, 2013

(30) Foreign Application Priority Data

Feb. 14, 2012  (CN) .......................... 2012 1 0032419

(51) Int. Cl.
*B62M 6/40*  (2010.01)
*F16D 23/14*  (2006.01)
*F16D 13/04*  (2006.01)
*F16D 41/22*  (2006.01)

(52) U.S. Cl.
CPC ................ *F16D 23/14* (2013.01); *F16D 13/04* (2013.01); *F16D 41/22* (2013.01)
USPC ....... 192/34; 180/206.1; 192/54.51; 192/84.6

(58) Field of Classification Search
USPC ....... 192/34, 54.51, 103 C; 180/206.1, 206.4, 180/206.5
See application file for complete search history.

(56) References Cited

U.S. PATENT DOCUMENTS

| 4,557,359 | A  | * | 12/1985 | Woodbridge | ..................... | 192/94 |
| 5,829,546 | A  | * | 11/1998 | Tseng | .......................... | 180/206.4 |
| 6,263,993 | B1 | * | 7/2001 | Lin | ............................. | 180/206.4 |
| 7,284,631 | B2 | * | 10/2007 | Rizzetto | ...................... | 180/206.4 |
| 7,364,524 | B2 | * | 4/2008 | Marsh et al. | .............. | 192/103 C |

\* cited by examiner

*Primary Examiner* — Rodney H Bonck
(74) *Attorney, Agent, or Firm* — Rosenberg, Klein & Lee

(57) ABSTRACT

A clutch type driving mechanism used in a hybrid powered vehicle is disclosed to include an axle housing mounted at a motor shaft of a motor, a sliding sleeve having a female thread meshed with a male thread of the axle housing, an axle bearing mounted in the sliding sleeve, an input shaft rotatably and slidably supported in the axle bearing with its one end normally kept apart from the axle housing and its other end provided with a gear, and an output shaft meshed with the gear of the input shaft. When the motor is started, the axle housing is driven by the motor shaft to rotate the sliding sleeve, and the sliding sleeve is moved along the axle housing toward the motor due to the effects of inertia, causing friction engagement between the input shaft and the axle housing so that the axle housing can drive the input shaft to transfer rotational motion to the output shaft. When the motor stands still, the inertia disappears, the sliding sleeve moved back from the axle housing, causing separation between the input shaft and the axle housing.

9 Claims, 3 Drawing Sheets

CLUTCH TYPE DRIVING MECHANISM FOR HYBRID POWERED VEHICLE

BACKGROUND OF THE INVENTION

1. Field of the Invention

The present invention relates to a clutch type driving mechanism and more particularly, to a clutch type driving mechanism for use in a hybrid powered vehicle.

2. Description of the Prior Art

A hybrid powered vehicle is a vehicle using more than one fuel or energy sources. It can be equipped with one or multiple driving systems. Common hybrid powered vehicles include hybrid electric vehicles (HEV) and motorized bicycles/electric bicycles. A motorized bicycle/electric bicycle includes a manpower driving mechanism for transferring a human driving force from the pedals to the rear wheel, and an electric driving mechanism using a motor as a power source for driving the crankshaft, front wheel axle or rear wheel axle.

However, due to a linking relationship between the electric driving mechanism and the manpower driving mechanism, it is necessary to switch to human power if the electric driving mechanism fails or the battery power is exhausted when riding the bicycle. At this time, the rider must overcome the weight of the motorized bicycle/electric bicycle itself and has to add additional pedaling force to overcome the resistance of the electric drive mechanism, resulting in difficulty to pedal the bicycle and losing the original convenience of the bicycle.

There are many different technical solutions have been proposed in order to overcome the above problems. Exemplars are seen in Taiwan Patent No. 1296597, entitled "Driving mechanism for electric bicycle"; Taiwan Utility Model No. M345033, entitled "Power saving device for electric/foot-operated dual-mode bicycle". These prior art designs employ the principle of freewheel (clutch) of ratchet and pawl mechanism to prevent transfer of power to the crankshaft during operation of the motor; on the contrary, when switched to the foot-operated mode, transfer of movement is interrupted from the motor. Further, Taiwan Utility Model No. M416565, entitled "Clutch type bicycle electric driving mechanism and its clutch type driver", teaches the use of a one-way axle bearing featuring the function of an axle bearing and the function of a clutch to prevent interference between manpower and motor.

SUMMARY OF THE INVENTION

It is therefore the main object of the present invention to provide a clutch type driving mechanism for hybrid powered vehicle, which enables the input shaft to transfer a rotational motion to the output shaft when it works as a drive shaft, or disconnects the input shaft from the power source when the output shaft works as a drive shaft, reducing the load on the output shaft.

To achieve this and other objects of the present invention, a clutch type driving mechanism for hybrid powered vehicle comprises a motor having a motor shaft for outputting a rotational kinetic energy, an axle housing mounted at the motor shaft of the motor and defining a male thread around the periphery thereof and a drive end face opposite to the motor, a sliding sleeve, which comprises an axle housing accommodation chamber and an axle bearing accommodation chamber respectively defined in two opposing ends thereof, a female thread disposed in the axle housing accommodation chamber and meshed with the male thread to secure the sliding sleeve to the axle housing, a projecting ridge radially inwardly extended from an inside wall thereof between the axle housing accommodation chamber and the axle bearing accommodation chamber and an annular stepped surface defined between the projecting ridge and the axle housing accommodation chamber, an axle bearing, which is mounted in the axle bearing accommodation chamber of the sliding sleeve and comprises an inner race and an outer race, an input shaft, which comprises a shaft body rotatably and slidably supported in the axle bearing, an end flange radially outwardly extended from one end of the shaft body and an input gear located at an opposite end of the shaft body, the end flange defining a driven end face and a bearing face that are respectively kept apart from the drive end face of the axle housing and the annular stepped surface of the sliding sleeve when the motor stands still, and an output shaft, which comprises an output gear meshed with the input gear for transferring a rotational motion to the opponent to cause the output shaft and the input shaft to rotate synchronously.

Preferably, the clutch type driving mechanism further comprises an elastic member for synchronous rotation with the inner race and the input shaft in a tensioned manner. The elastic member has two opposite ends thereof respectively stopped against the bearing face of the input shaft and the inner race of the axle bearing.

The main effects of the clutch type driving mechanism are: When the motor shaft of the motor works as a drive shaft, the rotational driving force of the motor can be transferred by the input shaft to the output shaft. On the contrary, when the motor stands still and the output shaft works as a drive shaft, the input shaft is disconnected from the motor to prevent the output shaft from bearing the load of the motor, facilitating transfer of the rotational driving force.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
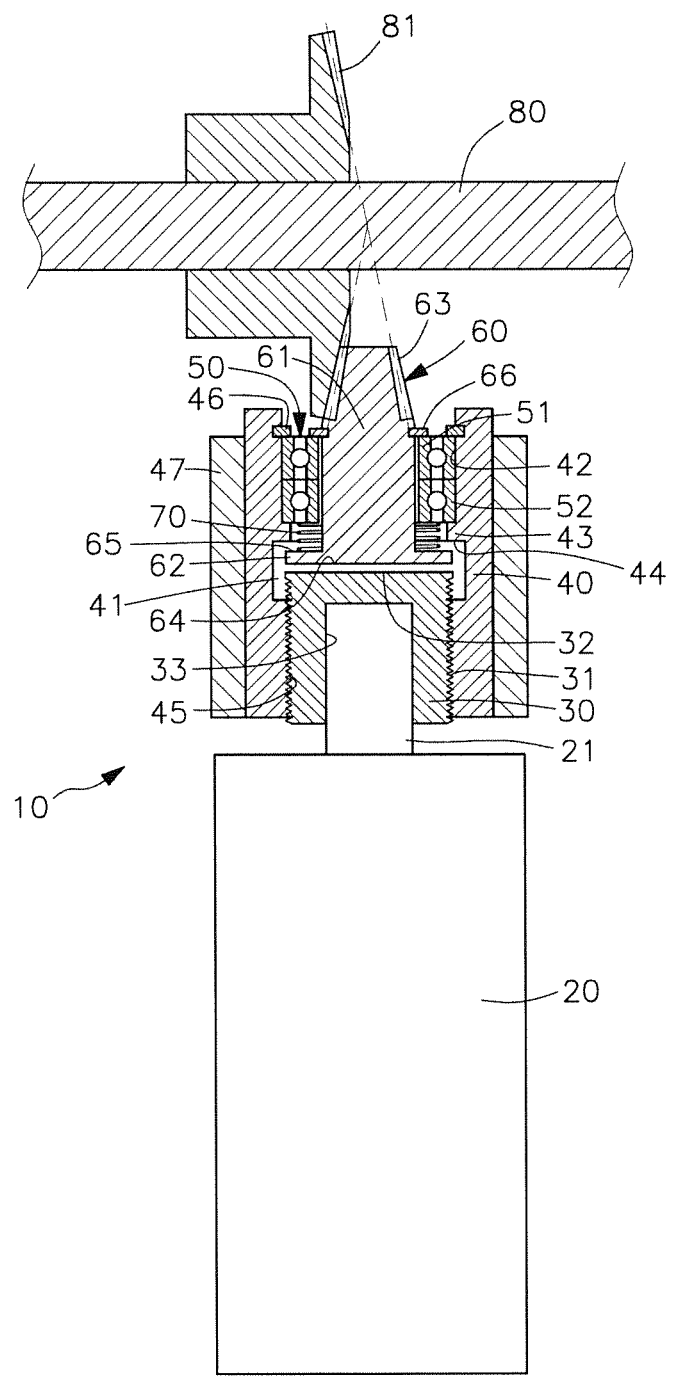
FIG. 1 is an axial sectional view of a clutch type driving mechanism for hybrid powered vehicle in accordance with the present invention, illustrating the input shaft and axle housing kept apart during an off status of the motor.

Referring to FIG. 1, a clutch type driving mechanism for hybrid powered vehicle in accordance with the present invention is shown. The clutch type driving mechanism 10 comprises a motor 20, an axle housing 30, a sliding sleeve 40, an axle bearing 50, an input shaft 60, a pressure spring 70, and an output shaft 80.

The motor 20 is configured to convert the electric energy of a storage battery (not shown), or other energy source, for example, solar energy, into a kinetic energy for moving a bicycle. The motor 20 comprises a motor shaft 21 for output of its generated kinetic energy.

The axle housing 30 is a hollow cylindrical member comprising a male thread 31 extending around the outer perimeter thereof for connecting the sliding sleeve 40, and an axle hole 33 extending in an axial direction for the insertion of the motor shaft 21 so that the axle housing 30 can be joined to the motor shaft 21 for synchronous rotation. Preferably, the axle hole 33 is a blind hole so that the axle housing 30 can be capped on one end of the motor shaft 21, i.e., the axle housing 30 can provide a planar drive end face 32 at one end thereof opposite to the open end of the axle hole 33. The effect of this planar drive end face 32 will be explained latter.

The sliding sleeve 40 is a hollow cylindrical member comprising an axle housing accommodation chamber 41 defined in one end thereof and adapted for accommodating the axle housing 30, an axle bearing accommodation chamber 42 defined in an opposite end thereof and adapted for accommodating the axle bearing 50, a projecting ridge 43 radially inwardly extended from the inside wall thereof between the axle housing accommodation chamber 41 and the axle bearing accommodation chamber 42, and an annular stepped surface 44 defined between the projecting ridge 43 and the axle housing accommodation chamber 41. Alternatively, the projecting ridge 43 can be a component, for example, an inner snap ring affixed to the inside of the sliding sleeve 40. Further, a female thread 45 is provided in the accommodation chamber 41 of the sliding sleeve 40 for threading engagement with the male thread 31 of the axle housing 30 so that the sliding sleeve 40 can be rotated with the axle housing 30 and moved along the axle housing 30 toward the motor 20 subject to inertia. Further, an inner snap ring 46 is mounted in one end of the axle bearing accommodation chamber 42 remote from the projecting ridge 43 to constrain the axle bearing 50 to the inside of the axle bearing accommodation chamber 42, preventing axle bearing 50 slippage. Because the sliding sleeve 40 can make a relative motion when the motor 20 is started, in this preferred embodiment, the sliding sleeve 40 is rotatably and slidably supported in a socket 47, enhancing the inertial force and rotational stability. This socket 47 is fixedly mounted in the vehicle frame of the hybrid poweredvehicle (not shown).

The axle bearing 50 is fixedly mounted in the axle bearing accommodation chamber 42 of the sliding sleeve 40, comprising an inner race 51 and an outer race 52. The inner race 51 has its one end suspended in air, and its other end stopped against an outer snap ring 66 of the input shaft 60. The outer race 52 has its one end supported on the projecting ridge 43 of the sliding sleeve 40, and its other end stopped at the bottom side of the inner snap ring 46 of the sliding sleeve 40.

The input shaft 60 comprises a shaft body 61 inserted through the inner race 51 of the axle bearing 50 with a clearance left therebetween for allowing the input shaft 61 to be rotated relative to the axle bearing 50 and moved along the axis of the axle bearing 50. The input shaft 60 further comprises an end flange 62 radially outwardly extended from one end of the shaft body 61, and an input gear 63 formed on an opposite end of the shaft body 61. The outer diameter of the end flange 62 is larger than the inner diameter of the projecting ridge 43. Further, the end flange 62 provides a driven end face 64 facing toward the axle housing 30, and a bearing face 65 facing toward the axle bearing 50. When the motor 20 stands still, the driven end face 64 and bearing face 65 of the end flange 62 are respectively kept apart from the drive end face 32 of the axle housing 30 and the annular stepped surface 44 of the sliding sleeve 40 by a gap. When the motor 20 is started, the sliding sleeve 40 will move along the axle housing 30 toward the motor 20 due to the effects of inertia, forcing the drive end face 32 into abutment against the driven end face 64 to produce a friction force. Subject to this friction force, the rotational motion is transferred through the axle housing 30 to the input shaft 60. Further, the drive end face 32 and the driven end face 64 can be embossed or coarsened to increase the friction force, enabling the axle housing 30 to rotate the input shaft 60 positively.

The pressure spring 70 is arranged around the shaft body 61 of the input shaft 60, having its one end supported on the bearing face 65 of the input shaft 60 and its opposite end stopped against the inner race 51 of the axle bearing 50. Thus, the pressure spring 70 is rotatable with the inner race 51 and the input shaft 60 in a tensioned status. In this embodiment, the pressure spring 70 is a supplementary member adapted to absorb impact during contact between the input shaft 60 and the axle housing 30, and to keep the input shaft 60 and the sliding sleeve 40 fully apart when the motor 20 stands still.

The output shaft 80 in this embodiment is a crankshaft rotatably supported in the bottom bracket of an electric bicycle, and meshed with the input gear 63 by means of an output gear 81 to transfer a rotational motion to the opponent, causing the input shaft 60 and the output shaft 80 to rotate synchronously. In this embodiment, the input gear 63 and the output gear 81 are bevel gears. In another embodiment, the input gear 63 can be a worm, and the output gear 81 can be a worm gear.

Figure 2:
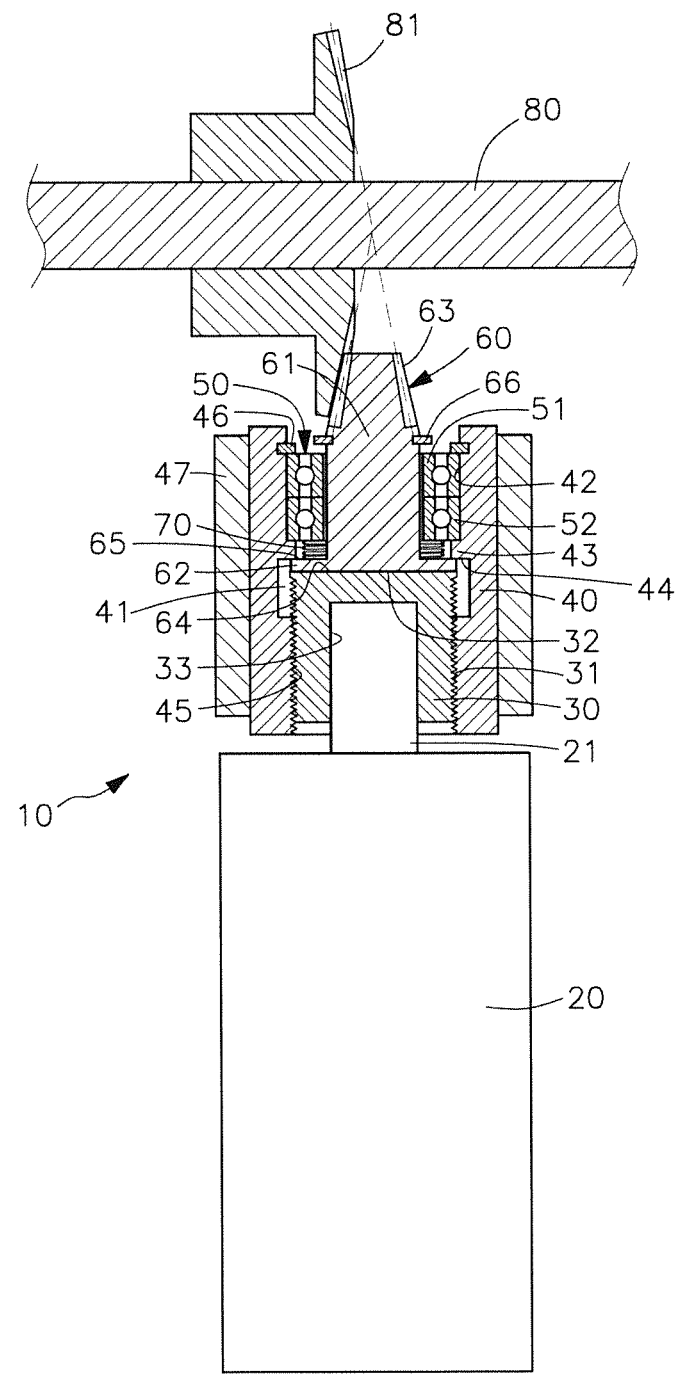
FIG. 2 is an axial sectional view of the present invention, illustrating the input shaft and axle housing abutted against each other during motor operation.

Referring to FIG. 2, when the motor 20 is started, the axle housing 30 is rotated with the motor shaft 21 to cause the sliding sleeve 40 to rotate. In the moment the sliding sleeve 40 starts to rotate, the male thread 31 of the axle housing 30 and the female thread 45 of the sliding sleeve 40 will cause the sliding sleeve 40 to move along the axle housing 30 toward the motor 20 due to the effects of inertia, forcing the annular stepped surface 44 to push the bearing face 65 of the input shaft 60 in the same direction, and therefore, the driven end face 64 of the input shaft 60 will be forced into contact with the drive end face 32 of the axle housing 30. When the driven end face 64 of the input shaft 60 is abutted against the drive end face 32 of the axle housing 30, the friction force causes the sliding sleeve 40 and the axle housing 30 to produce a potential difference, enhancing contact tightness between the drive end face 32 of the axle housing 30 and the driven end face 64 of the input shaft 60. Thus, the friction enables the rotational motion to be transferred from the axle housing 30 to the input shaft 60 and then to the output gear 81 via the input gear 63, causing the output shaft 80 to rotate synchronously. At this time, the bicycle can be driven by the man power driving mechanism. Further, the movement of the axle bearing 50 subject to the movement of the sliding sleeve 40 can further compress the pressure spring 70, causing the pressure spring 70 to reserve elastic potential energy.

As shown in FIG. 1, when the motor 20 is stopped, the inertia disappears. Thus, the sliding sleeve 40 moves in the reversed direction relative to the axle housing 30 to push the axle bearing 50 against the outer snap ring 66, moving the input shaft 60 in direction away from the axle housing 30, and therefore, the drive end face 32 and the driven end face 64 are separated. Under the effects of the pressure spring 70, the bearing face 65 of the input shaft 60 is kept away from the annular stepped surface 44 of the sliding sleeve 40 by a certain gap, avoiding contact. When operating the man power driving mechanism to drive the output shaft 80 at this time, the input shaft 60 will rotate with the output shaft 80 in idle without transferring the power to the motor 20. Thus, the rider can pedal the man power driving mechanism efficiently with less effort due to less resistance (load), reducing power loss.

In addition to the aforesaid effect, the outer snap ring 66 also provides the functions of: (1) supporting the inner race 51 of the axle bearing 50 against displacement under a loaded operation during movement of the input shaft 60 with the sliding sleeve 40 toward the axle housing 30 when the motor 20 is started, and (2) reducing occurrence of vibration during a loaded operation of the input shaft 60.

Because the outer snap ring 66 is mounted around the periphery of the input shaft 60, the axle bearing 50 may be forced out of place when an abnormal interference occurs. At this time, the inner snap ring 46 of the sliding sleeve 40 positively secures the axle bearing 50 in place, preventing abnormal loosening of the axle bearing 50.

Figure 3:
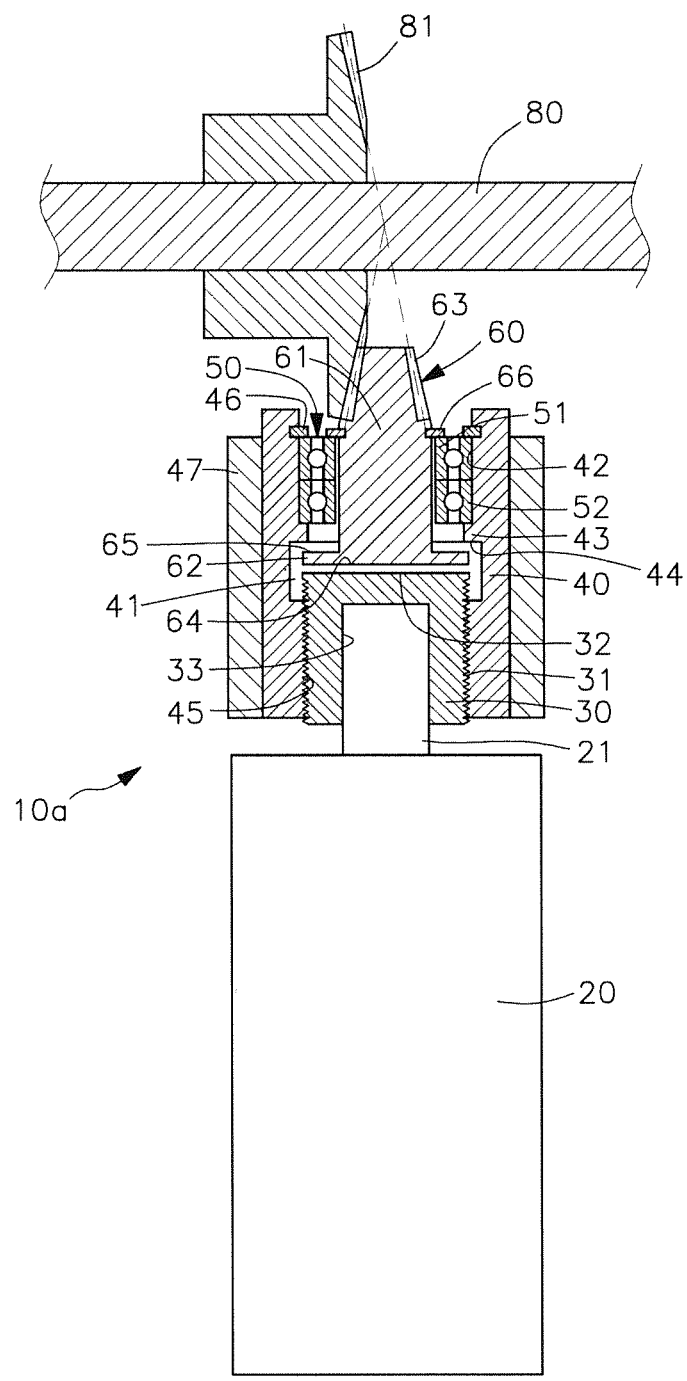
FIG. 3 is a sectional view similar to FIG. 1, illustrating an alternate form of the clutch type driving mechanism for hybrid powered vehicle in accordance with the present invention.

Further, as stated above, the pressure spring 70 is a supplementary member, and therefore it can be omitted. In the embodiment shown in FIG. 3, the clutch type driving mechanism 10a eliminates the aforesaid pressure spring 70. This second embodiment is substantially similar to the embodiment shown in FIGS. 1 and 2 with the exception of the omission of the pressure spring 70. Therefore, like reference signs denote like component parts throughout these two embodiments. Further, other equivalent elastic component may be used to substitute for the aforesaid pressure spring 70, achieving the same effects.

Further, except for use in an electric bicycle, the clutch type driving mechanism of the present invention can also be used in any other hybrid powered vehicle.

Although particular embodiments of the invention have been described in detail for purposes of illustration, various modifications and enhancements may be made without departing from the scope of the invention. Accordingly, the invention is not to be limited except as by the appended claims.

What the invention claimed is:

1. A clutch type driving mechanism used in a hybrid powered vehicle, comprising:

a motor comprising a motor shaft for outputting a rotary kinetic energy;

an axle housing mounted on said motor shaft, said axle housing comprising a male thread extending around an outer perimeter thereof and a drive end face opposite to said motor;

a sliding sleeve comprising an axle housing accommodation chamber an axle bearing accommodation chamber respectively defined in two opposing ends thereof, said axle housing accommodation chamber comprising a female thread matching said male thread of said axle housing for enabling said sliding sleeve to be mounted in said axle housing, a projecting ridge radially inwardly extended from an inside wall thereof between said axle housing accommodation chamber and said axle bearing accommodation chamber, and an annular stepped surface defined between said projecting ridge and said axle housing accommodation chamber;

an axle bearing mounted in said axle bearing accommodation chamber of said sliding sleeve, said axle bearing comprising an inner race and an outer race;

an input shaft comprising a shaft body rotatably and slidably supported in said axle bearing, an end flange radially outwardly extended from one end of said shaft body and an input gear located at an opposite end of said shaft body, said end flange defining a driven end face and a bearing face, said driven end face and said bearing face being respectively kept apart from said drive end face of said axle housing and said annular stepped surface of said sliding sleeve when said motor stands still; and an output shaft comprising an output gear meshed with said input gear for transferring a rotational motion to the opponent to cause said output shaft and said input shaft to rotate synchronously.

2. The clutch type driving mechanism as claimed in claim 1, wherein said projecting ridge is integrally formed of a part of said sliding sleeve.

3. The clutch type driving mechanism as claimed in claim 1, wherein said input shaft further comprises an outer snap ring mounted at said shaft body; said inner race of said axle bearing has one end thereof suspended and an opposite end thereof stopped against said outer snap ring.

4. The clutch type driving mechanism as claimed in claim 1, wherein said sliding sleeve further comprises an inner snap ring mounted in said axle bearing accommodation chamber, said outer race of said axle bearing has two opposite ends thereof respectively supported on said projecting ridge and said inner snap ring.

5. The clutch type driving mechanism as claimed in claim 1, further comprising an elastic member for synchronous rotation with said inner race and said input shaft in a tensioned manner, said elastic member having two opposite ends thereof respectively stopped against said bearing face of said input shaft and said inner race of said axle bearing.

6. The clutch type driving mechanism as claimed in claim 5, wherein said elastic member is a pressure spring.

7. The clutch type driving mechanism as claimed in claim 1, wherein said input gear and said output gear are bevel gears.

8. The clutch type driving mechanism as claimed in claim 1, wherein said drive end face of said axle housing and said driven end face of said input shaft are coarsened faces.

9. The clutch type driving mechanism as claimed in claim 1, further comprising a socket adapted to support said sliding sleeve for enabling said sliding sleeve to rotate and to slide therein.

* * * * *